(12) United States Patent
Lignon et al.

(10) Patent No.: US 7,997,134 B2
(45) Date of Patent: Aug. 16, 2011

(54) MEASUREMENT BY GYROSCOPIC SYSTEM

(75) Inventors: Christian Lignon, Paris (FR); Arnauld Carre, Paris (FR)

(73) Assignee: Sagem Defense Securite, Paris (FR)

( * ) Notice: Subject to any disclaimer, the term of this patent is extended or adjusted under 35 U.S.C. 154(b) by 636 days.

(21) Appl. No.: 12/100,832

(22) Filed: Apr. 10, 2008

(65) Prior Publication Data

US 2009/0158846 A1  Jun. 25, 2009

(30) Foreign Application Priority Data

Dec. 21, 2007 (FR) .................................. 07 60314

(51) Int. Cl.
*G01P 9/04* (2006.01)
*G01C 19/56* (2006.01)

(52) U.S. Cl. ................................... 73/504.12

(58) Field of Classification Search ............. 73/1.37, 73/1.38, 504.12, 504.04, 504.13, 504.14, 73/510, 511; 702/87–88, 104

See application file for complete search history.

(56) References Cited

U.S. PATENT DOCUMENTS

| | | | |
|---|---|---|---|
| 6,189,382 B1 | 2/2001 | Johnson | |
| 6,367,326 B1 * | 4/2002 | Okada | 73/504.12 |
| 6,701,786 B2 * | 3/2004 | Hulsing, II | 73/514.02 |
| 6,834,247 B2 * | 12/2004 | Hiedenstierna et al. | 702/85 |
| 6,925,401 B2 * | 8/2005 | Kameya | 702/87 |
| 7,325,454 B2 * | 2/2008 | Saito et al. | 73/511 |
| 7,644,604 B2 * | 1/2010 | Hotelling et al. | 73/1.77 |
| 7,814,793 B2 * | 10/2010 | Sato | 73/504.12 |

FOREIGN PATENT DOCUMENTS

| | | |
|---|---|---|
| EP | 1 571 417 A | 2/2005 |
| EP | 1 752 733 A | 8/2006 |
| FR | 2 755 227 | 4/1998 |
| FR | 2 804 754 A | 11/2000 |

OTHER PUBLICATIONS

Andrei M. Shkel; Type I and Type II Micromachined Vibratory Gyroscopes; Mechanical & Aerospace Engineering University of California—Irvine 4208 Engineering Gateway Buklding Irvine, CA, USA, 92697-3975; 0-7803-9454-2/06/©2006 IDDD; pp. 586-592.

* cited by examiner

*Primary Examiner* — Helen C. Kwok
(74) *Attorney, Agent, or Firm* — Miller, Matthias & Hull llp

(57) ABSTRACT

A gyroscopic system is disclosed comprising at least a vibrating gyroscope, as a first mechanism of angle measurement, designed to provide a first measurement of angle values according to a measurement axis; and a second mechanism of angle measurement, designed to provide a second measurement of angle values according to said measurement axis. First angle values through the first angle measurement mechanism vibrating in a current vibration position and second angle values through the second angle measurement mechanism are provided simultaneously; and from these second angle values corrected on the basis of a comparison of the first and second angle values are deduced. Then the vibration position of the first angle measurement mechanism is changed from the current position to another vibration position. First angle values through the first angle measurement mechanism and second angle values through the second angle measurement mechanism are then provided simultaneously; and from these first angle values corrected on the basis of a comparison of the first and second angle values are deduced.

19 Claims, 2 Drawing Sheets

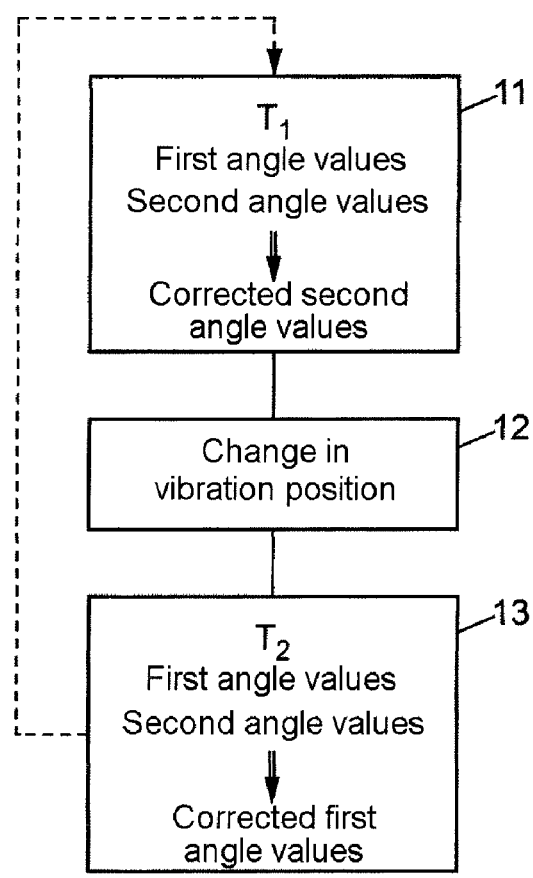
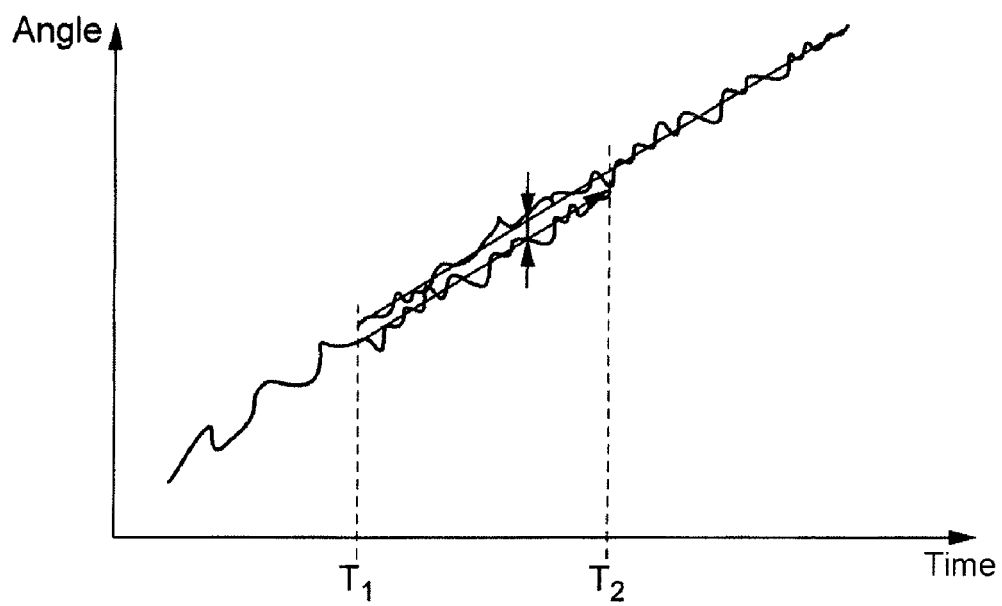

MEASUREMENT BY GYROSCOPIC SYSTEM

CROSS-REFERENCE TO RELATED APPLICATION

This application claims priority under the Paris Convention to French patent Application No. FR 07 60314, filed on Dec. 21, 2007.

FIELD OF THE DISCLOSURE

The present invention relates to vibrating gyroscopes, the principle of which is based on the Coriolis effect, and it relates more particularly to the precision of the values of rotation angle provided by this type of gyroscope.

BACKGROUND OF THE DISCLOSURE

Such gyroscopes are conventionally used in inertial systems designed for navigation, as is the case, for example, for a gyroscopic compass which is adapted to provide a measurement of angle in relation to a reference direction which is that of geographical North (direction).

Axisymmetric gyroscopes of the Coriolis Vibratory Gyroscope (CVG) type, for example of the Hemispherical Resonance Gyroscope (HRG) or more generally said to be of type I, such as those described in the document 'Type I and Type II micromachined vibratory gyroscopes' by Andrei M. Shkel, pages 586-593, IEEE/ION (Institute of Electrical and Electronic Engineers/Institute of Navigation') PLANS 2006, San Diego, Calif., USA, operate open-loop and measure an absolute rotation angle based on a measurement of an angle representing the vibration position of the gyroscope relative to the measurement electrodes.

Such a gyroscope may also be used closed-loop through monitoring the vibration position via a control of the precession as is described in particular in the document FR 2 755 227.

In this case, the vibration position of the gyroscope is kept in a fixed position and the measurement is deduced from the control that it is necessary to apply to the gyroscope to keep it in this fixed vibration position. This type of operation is also called "gyroscopic feedback". The values provided by the physical measurement then no longer correspond to an angle but to a rotation speed.

The measurements provided by these vibrating gyroscopes may be marred by errors that are essentially a function of the vibration position relative to the measurement electrodes. These errors are therefore variables depending on the vibration position.

These errors have the effect of reducing the level of precision of the values thus measured. It is therefore useful to seek to reduce these errors in order to improve the performance of this type of gyroscope.

In the context of closed-loop operation, or also of gyroscopic operation, the document EP 1 752 733 describes a method aiming to reduce such errors affecting the measured values so as to boost the performance of such measurement devices.

To do this, the symmetry in the errors of such gyrometers between two vibration positions of said gyrometers 90° apart is used as a starting point and, as a result, the mean value of these errors is reduced by changing the vibration position of the gyrometers between two vibration positions separated by 90°.

Throughout the duration of switching from one vibration position to another, this document foresees using a second closed-loop gyroscope, or another gyrometer, to provide a measurement of rotation speed in place of the first gyrometer when the latter is in the course of carrying out a change in vibration position and therefore cannot provide a pertinent measurement of the rotation speed to be measured.

However, it should be noted that in relation to the measurements provided by a gyroscope in open-loop operation the measurements provided by a gyrometer exhibit a reduction in the precision of the measurement provided which essentially linked with uncertainties introduced by the transformation that must then be applied to the control in order to obtain a rotation speed.

SUMMARY OF THE INVENTION

The present invention aims to overcome these drawbacks.

One embodiment of the present invention concerns type I gyroscopes.

The present invention aims to improve the situation.

A first aspect of the present invention proposes a measurement method by a gyroscopic system comprising at least:
  a vibrating gyroscope, as a first means of angle measurement, designed to change its vibration position among a plurality of vibration positions and to provide a first measurement of angle values according to a measurement axis in one of the vibration positions of said plurality of vibration positions, said first means of measurement having a first zero reference as angle value; and
  a second means of angle measurement, designed to provide a second measurement of angle values according to said measurement axis, said second measurement having a second zero reference as angle value; said measurement method comprising the following steps to implement a change in vibration position of the first angle measurement means:
  (a) in a first period of time, simultaneously providing first angle values through the first angle measurement means vibrating in a current vibration position from the plurality of vibration positions and second angle values through the second angle measurement means, and deducing from these corrected second angle values by adapting the second zero reference on the basis of a comparison of the first and second angle values obtained in said first period of time;
  (b) in a second period of time, changing the vibration position of the first angle measurement means from the current position to another vibration position from said plurality of vibration positions;
  (c) in a third period of time, simultaneously providing first angle values through the first angle measurement means and second angle values through the second angle measurement means, and deducing from these corrected first angle values by adapting the first zero reference on the basis of a comparison of the first and second angle values obtained in said third period of time.

Thanks to these measures the vibration position of the vibrating gyroscope that is used as the first measurement means can be rotated while continuing to provide pertinent angle measurement values.

This is because, first of all, the first and the second measurement means are designed to provide angle values. Hence it is advantageously possible to adapt the angle values provided by the first measurement means, or by the second measurement means respectively, to the angle values provided by the second measurement means, or by the first measurement means respectively. To this end, provision is made to adapt the first zero reference of the first measurement means, or the second zero reference of the second measurement means respectively, to the second zero reference of the second measurement means, or to the first zero reference of the first measurement means respectively.

By proceeding in this way, angle values that are consistent with each other can be provided throughout the process of changing the vibration position of the vibrating gyroscope. This is because, whether the measured angle values are provided by the first angle measurement means or by the second angle measurement means, these angle values are advantageously corrected relative to their respectively used zero references.

Consequently, it is here possible to control a change in vibration position of the vibrating gyroscope, which allows the average of the errors respectively attaching to each of the vibration positions of the vibrating gyroscope to be found while continuing to provide angle values that are consistent with each other.

It should be noted that it is not possible to offer such consistency in measurement values provided by a system of the prior art because measurements of rotation speed are concerned.

By proceeding in this way, the average of the measurement errors of the first measurement means, which are related to the vibration positions of the vibrating gyroscope, may advantageously be found over the different vibration positions employed in the vibrating gyroscope. The angle measurement may be provided by the first measurement means which vibrates in a first position, then, while the vibration position of the vibrating gyroscope is being changed from the first vibration position to a second vibration position, the angle measurement may advantageously be provided by the second measurement means and following correction of these angle values in relation to the various zero references of the first and second measurement means.

It should be noted that the second angle measurement means is any means of angle measurement whatsoever.

Hence, in such conditions the angle measurement provided by the vibrating gyroscope is then provided sometimes marred by errors relating to the first vibration position, sometimes marred by errors relating to the second vibration position.

There is no limitation attached to the number of vibration positions in which configuration of the vibrating gyroscope is foreseen.

At each change in vibration position the steps (a), (b) and (c) may advantageously be repeated so as to obtain pertinent and consistent angle measurement values according to an embodiment of the present invention.

In this way, the gyroscopic system may provide the following angle values:
  before and during the step (a) and after the step (c), the angle values provided by the first angle measurement means;
  during the steps (b) and (c), the angle values provided by the second angle measurement means.

A change in vibration position of the first angle measurement means according to the steps (a) to (c) may then be repeated several times in succession.

It may furthermore be anticipated, in the case where the vibrating gyroscope is able to vibrate in a number K of successive vibration positions, that such a change in the vibration position allows the passage from a vibration position i to a vibration position i+1 for all i between 1 and K−1. At each repetition of the steps (a) to (c), the first vibration position of the step (a) corresponds to the vibration position in which the vibrating gyroscope vibrates at the last step (c) carried out and the second vibration position corresponds to the following vibration position in the plurality of vibration positions considered.

The gyroscopic system may comprise a number N of vibrating gyroscopes, N being an integer greater than or equal to 3. In this case, the N gyroscopes are designed to change their vibration position among a plurality of vibration positions and to provide respective measurements of angle values according to respective measurement axes in respective vibration positions of said plurality of vibration positions. The first measurement means may then correspond to any one of N vibrating gyroscopes, and the second measurement means may correspond to any set of gyroscopes among the N−1 other gyroscopes of the system and is designed to provide an angle measurement according to the measurement axis of the first measurement means and relative to the second zero reference.

In such an architecture of a system of vibrating gyroscopes, the present invention can be advantageously applied to all or part of these various vibrating gyroscopes alternately, as the first measurement means may successively correspond to the various vibrating gyroscopes of the measurement system considered.

When N is equal to 3, the three vibrating gyroscopes may have two by two respectively coplanar and nonlinear measurement axes.

In this case, it is possible to anticipate defining a first doublet of different linear combinations allowing the determination of angle values according to a first measurement axis, and a second doublet of different linear combinations allowing the determination of angle values according to a second measurement axis. The measurement method according to an embodiment of the present invention may then be applied for each of the doublets of linear combinations.

At least two of the measurement axes may also be approximately perpendicular.

Also, when N is equal to 3, the three gyroscopes may be situated in the same plane such that the respective measurement axes form an angle approximately equal to 120°.

When N is equal to 4, the four gyroscopes may be situated in space in such a way that their respective measurement axes are oriented according to the four trisectors of space.

When N is equal to 4, the four vibrating gyroscopes may have three by three noncoplanar and two by two noncolinear measurement axes.

It is then possible to define a first doublet of different linear combinations allowing the determination of angle values according to a first measurement axis, and a second doublet of different linear combinations allowing the determination of angle values according to a second measurement axis, and a third doublet of different linear combinations allowing the determination of angle values according to a third measurement axis. The steps of the measurement method according to an embodiment of the present invention may then be applied for each of the doublets of linear combinations.

The vibration positions of the plurality of vibration positions may also be successively separated by an angle value corresponding to 360° divided by an integer.

The vibration positions of the plurality of vibration positions may be determined to distribute the vibration positions used between 0 and $2\pi$ radians.

When the measurement system comprises four gyroscopes A, B, C and D situated in space in such a way that their respective measurement axes are oriented approximately according to the four trisectors of space, the doublets of linear combinations among their four measurements denoted a, b, c and d respectively, used in order to reconstitute three approximately perpendicular measurement axes, are the following:

for a first measurement axis x:
  a+b and −(c+d);
for a second measurement axis y:
  b+c and −(a+d); and
for a third measurement axis z:
  a+c and −(b+d).

The instruction to change the vibration position may be carried out successively on each of the vibrating gyroscopes.

The four vibrating gyroscopes may be adapted so that the following equation is verified:

$$a+b+c+d=0$$

The vibration positions of the plurality of vibration positions may be successively separated by an angle value corresponding to 360° divided by an integer.

It may also be arranged to determine the vibration positions of the plurality of vibration positions in real time in order to distribute the vibration positions used between 0 and 360 degrees while taking account of the vibration positions already traversed.

It may also be arranged to obtain the first and/or second corrected angle values by furthermore taking a scaling factor into account.

A second aspect of the invention proposes a gyroscopic measurement system designed to implement a procedure according to the first aspect of the present invention.

It comprises at least:
  a vibrating gyroscope, as a first means of angle measurement, designed to change its vibration position among a plurality of vibration positions and to provide a first measurement of angle values according to a measurement axis in one of the vibration positions of said plurality of vibration positions, said first means of measurement having a first zero reference and providing first values; and
  a second means of angle measurement, designed to provide a second measurement of angle values according to said measurement axis, said second measurement having a second zero reference as angle value and providing second values;

said gyroscopic system furthermore comprising:
  a unit for correcting the second angle values, designed to provide corrected second angle values by adapting the second zero reference on the basis of a comparison of the first and second angle values obtained in a period of time;
  a unit for correcting the first angle values, designed to provide corrected first angle values by adapting the first zero reference on the basis of a comparison of the first and second angle values obtained in another period of time;

said units for correcting the first and second values being employed during a change in vibration position of at least the first means of angle measurement.

The angle values may advantageously be alternately provided by the first angle measurement means and by the second angle measurement means during a change in vibration position of the first angle measurement means.

BRIEF DESCRIPTION OF THE DRAWINGS

Other features and advantages of the invention will also become apparent on reading the following description. The latter is purely illustrative and should be read with regard to the appended drawings in which:

FIG. 1 illustrates the main steps of a measurement method by a gyroscopic system according to an embodiment of the present invention;

FIG. 2 illustrates the evolution of measurement values provided by a gyroscopic system according to an embodiment of the present invention.

DETAILED DESCRIPTION

Figure 3:
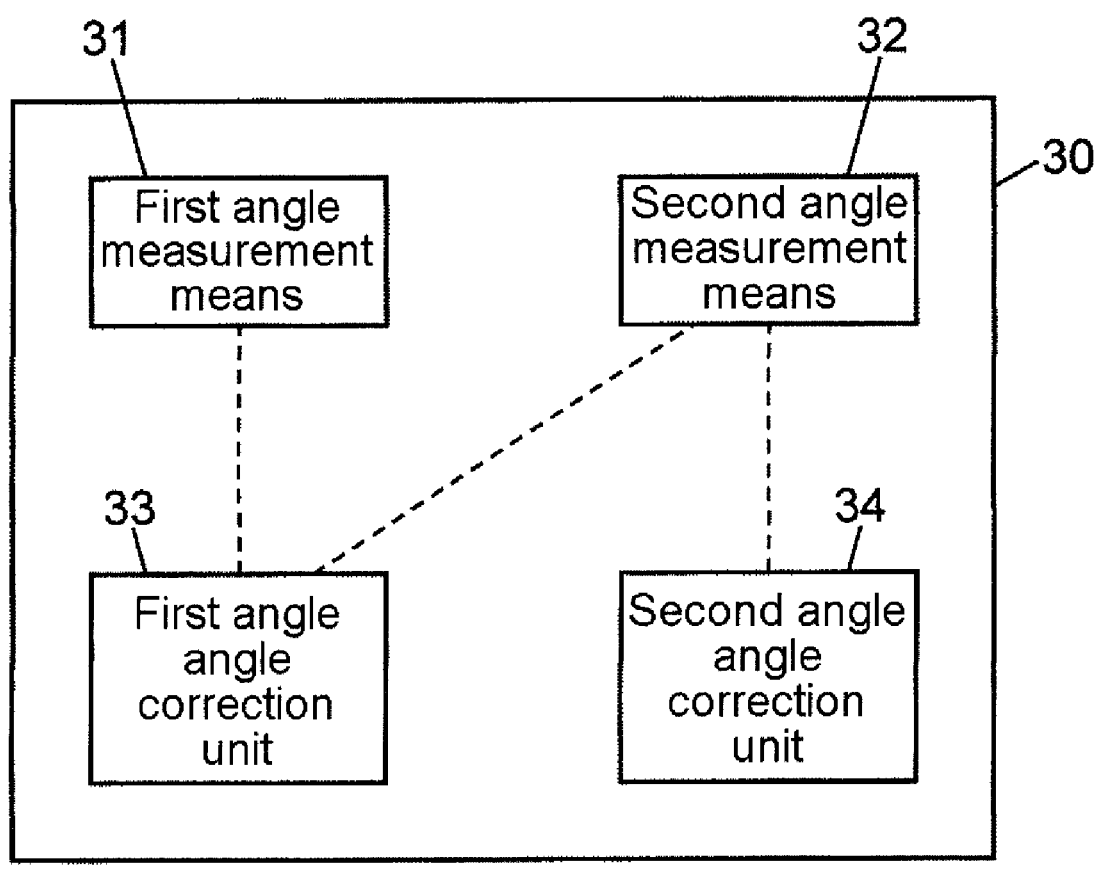
FIG. 3 illustrates a gyroscopic system according to an embodiment of the present invention.

FIG. 1 illustrates the main steps of a measurement method by a gyroscopic system according to an embodiment of the present invention.

In a step 11, for a period of time T1, the first and second angle measurement means simultaneously provide values, the first and second angle values respectively. Based on these two types of angle values, it is then possible to correct the second angle values, and the corresponding zero reference, in such a way as to make them consistent with the first angle values relative to the associated zero reference.

In this way, angular continuity between the values provided by the first and the second measurement means can be ensured. It is then possible to bring about a change in the vibration position of the vibrating gyroscope that constitutes the first measurement means, as the measurement system is then able to provide consistent values, i.e. corrected angle values, from the measurement made by the second measurement means. In a step 12 this change in vibration position is then carried out on the vibrating gyroscope.

Following this change in position, it may be arranged either to continue to provide angle values from the second measurement means for a certain period of time, or again to provide angle values from the first measurement means which then vibrates in a different vibration position. No limitation attaches to the present invention with regard to this certain period of time in which the provision of corrected second values may be desired.

In step 13, once again, the first and second angle values are simultaneously taken into consideration so as to be able to correct the first angle values that are provided by the first vibrating measurement means in the vibration position instructed during its last change.

FIG. 2 illustrates measurement values provided by a gyroscopic system according to an embodiment of the present invention.

The variation of angle values is described as a function of time in the course of the steps of the measurement method.

Here, before a time $T_1$, the angle values are provided by the first measurement means. Then, between the times $T_1$ and $T_2$, the angle values provided by the first measurement means and those provided by the second measurement means are taken into consideration to obtain corrected second angle values provided based on the values provided by the second measurement means.

This period therefore corresponds to a recovery period which is used for the consistency of the angle values provided by the system as time goes by.

Then, when this recovery period has passed, a change in vibration position of the first measurement means can be instructed. In fact the measurement system then provides the corrected second measurement values.

FIG. 3 illustrates a gyroscopic measurement system according to an embodiment of the present invention.

This system comprises:
  a vibrating gyroscope 31 which provides the first values; and a second angle measurement means 32 which provides the second values;

a unit for correcting the second angle values 34, designed to provide corrected second angle values by adapting the second zero reference on the basis of a comparison of the first and second angle values obtained in a period of time;

a unit for correcting the first angle values 33, designed to provide corrected first angle values by adapting the first zero reference on the basis of a comparison of the first and second angle values obtained in another period of time.

The units for correcting the first and second values are employed during a change in vibration position of at least the first means of angle measurement.

The plurality of vibration positions of the vibrating gyroscope may correspond to K different positions. The integer K may be chosen in order to attain optimum efficiency. It should be noted here that the improvement in performance obtained by averaging errors attaching to the various vibration positions by applying the measurement method according to an embodiment may correspond to a loss in precision due to cutting the global measurement duration into several measurement periods linked with the successive changes in vibration position over the K vibration positions.

System performance may also be improved by adjusting the ratio of the recovery duration and the period of time elapsing between two changes in vibration position. Indeed, it is a matter of defining a compromise between the improvement in performance obtained by averaging the errors attaching to the various vibration positions and the loss in performance connected with the fact that at each switching a link is introduced with the noise present in the first and second angle values over the recovery duration.

The gyroscopic measurement system may comprise a number N of vibrating gyroscopes, N being an integer greater than or equal to 3, the N gyroscopes being designed to change their vibration position among a plurality of vibration positions and to provide respective measurements of angle values according to respective measurement axes in respective vibration positions of said plurality of vibration positions. In this case, the first measurement means may correspond to any one of N vibrating gyroscopes, while the second measurement means corresponds to any set of gyroscopes among the N−1 other gyroscopes of the system, designed to provide an angle measurement according to the measurement axis of the first measurement means and relative to the second zero reference.

Several different configurations may be foreseen by way of example, but without limiting the applications of the present invention.

Thus, for example, when N is equal to 3, the three vibrating gyroscopes may have two by two respectively coplanar and nonlinear measurement axes.

When N is equal to 3, the three gyroscopes may be situated in the same plane such that the respective measurement axes form an angle approximately equal to 120°.

When N is equal to 4, the four gyroscopes may be situated in space in such a way that their respective measurement axes are oriented according to the four trisectors of space.

When N is equal to 4, the four vibrating gyroscopes may have three by three noncoplanar and two by two noncolinear measurement axes.

In one embodiment of the present invention provision may also be made for the second measurement means to comprise a plurality of vibrating gyroscopes in which at least one vibrating gyroscope is designed to change vibration position and to provide an angle value measurement. The angle measurement that this at least one vibrating gyroscope provides may then be a linear combination of the angle values provided by the other gyroscopes of the second angle measurement means in order to correspond to the second angle value measurement according to the desired measurement axis.

In this case provision may furthermore be made to carry out an additional step in the course of the measurement method. Provision may thus be made to change the vibration position of one or more of the vibrating gyroscopes of the second angle measurement means from the current position to another vibration position from the plurality of vibration positions.

The second measurement means may, moreover, consist of vibrating gyroscopes, each designed to change vibration position.

When the first measurement means is a vibrating gyroscope and the second measurement means is also a vibrating gyroscope, provision may be made for the two vibrating gyroscopes to have their measurement axes colinear.

The following sections describe an application of the present invention in the context of calibrating a vibrating gyroscope within an inertial unit providing an orientation reference.

To this end, in a gyroscopic system comprising at least four noncolinear gyroscopes, it is foreseen to use measurements provided by three of these four gyroscopes during calibration of the fourth vibrating gyroscope.

The calibration step includes changing the vibration position of the vibrating gyroscope in the course of calibration. Hence, while one of the at least four vibrating gyroscopes is in the course of being calibrated, the measurements provided by the at least three other vibrating gyroscopes are used to provide the orientation reference.

More precisely, the calibration operation consists in placing the vibration in diverse positions and in taking the corresponding measurement from the vibrating gyroscope to be calibrated. It then suffices to subtract the real rotation of the bearer, measured by the three other gyroscopes, from these measurements. This operation is then successively repeated for the set of vibrating gyroscopes of the system according to an embodiment of the present invention.

It may be arranged that three of the vibrating gyroscopes are oriented according to the conventional trirectangular lines and a fourth vibrating gyroscope is oriented according to the trisector.

Hence, calibration of the gyroscopes can be successively ensured in the following manner.

The difference D between the gyroscope measurement being calibrated and that of the second measurement means, which comprises the three other vibrating gyroscopes, is calculated. This calculation of D is carried out in the period when an instruction to change the vibration position of the vibrating gyroscope to be calibrated is being applied.

D allows the angle the vibration has rotated to be known precisely even when the scaling factor having served to generate the position change is itself not precisely known. This apparent rotation measured by the gyroscope in the course of calibration can then be subtracted from navigation calculations.

This calculation is also carried out in the period where the vibration is left in a given position. In this way, by applying an instruction to change position, the vibration position may be divided into k positions and the value D is recorded for each of these k positions. In this way the measurement error of the gyroscope is known as a function of the vibration position, which allows a harmonic model of the error drift to be updated.

This procedure means that the same three gyroscopes can always be used for navigation, the corrections being introduced by means of updating the corresponding error model, and hence that switching transients can be avoided on the gyroscopes used to navigate.

In case significant movements of the bearer disturb the foreseen vibration positions, provision may advantageously be made to cancel updating of the drift model and delay it to a later sequence.

By applying principles of the present invention to an inertial unit and to the calibration of vibrating gyroscopes in this inertial unit, it is possible to proceed to calibrations at any moment in a transparent manner in the use of the unit. In fact, such a gyroscopic system may provide an orientation reference even when one of the vibrating gyroscopes is in the course of being calibrated.

The invention claimed is:

1. A measurement method by a gyroscopic system comprising at least:
   a vibrating gyroscope, as a first means of angle measurement, designed to change the vibration position of the vibrating gyroscope among a plurality of vibration positions and to provide a first measurement of angle values according to a measurement axis in one of the vibration positions of said plurality of vibration positions, said first means of angle measurement having a first zero reference as angle value; and
   a second means of angle measurement, designed to provide a second measurement of angle values according to said measurement axis, said second means of angle measurement having a second zero reference as angle value;
   said measurement method comprising the following steps to implement a change in vibration position of the first angle measurement means:
   (a) in a first period of time, simultaneously providing first angle values through the first angle measurement means vibrating in a current vibration position from the plurality of vibration positions and second angle values through the second angle measurement means, and deducing, from the first angle values and the second angle values, corrected second angle values by adapting the second zero reference on the basis of a comparison of the first and second angle values obtained in said first period of time;
   (b) in a second period of time, changing the vibration position of the first angle measurement means from the current position to another vibration position from said plurality of vibration positions;
   (c) in a third period of time, simultaneously providing first angle values through the first angle measurement means and second angle values through the second angle measurement means, and deducing, from the first angle values and the second angle values, corrected first angle values by adapting the first zero reference on the basis of a comparison of the first and second angle values obtained in said third period of time.

2. The measurement method according to claim 1, in which the gyroscopic system provides the following angle values:
   before and during the step (a) and after the step (c), the angle values provided by the first angle measurement means;
   during the steps (b) and (c), the angle values provided by the second angle measurement means.

3. The measurement method according to claim 1, in which a change in vibration position of the first angle measurement means according to the steps (a) to (c) is repeated several times in succession.

4. The measurement method according to claim 1, said gyroscopic system comprising a number N of vibrating gyroscopes, N being an integer greater than or equal to 3, the N gyroscopes being designed to change the vibration position of the N gyroscopes among a plurality of vibration positions and to provide respective measurements of angle values according to respective measurement axes in respective vibration positions of said plurality of vibration positions; the first measurement means corresponding to any one of N vibrating gyroscopes, the second measurement means corresponding to any set of gyroscopes among the N−1 other gyroscopes of the system and being designed to provide an angle measurement according to the measurement axis of the first measurement means and relative to the second zero reference.

5. The measurement method according to claim 4, in which at least two of the measurement axes are perpendicular.

6. The measurement method according to claim 4, in which N is equal to 3, said three vibrating gyroscopes have two by two respectively coplanar and nonlinear measurement axes.

7. The measurement method according to claim 4, in which N is equal to 3 and in which the three gyroscopes are situated in the same plane such that the respective measurement axes form an angle approximately equal to 120°.

8. The measurement method according to claim 4, in which N is equal to 4 and in which the four gyroscopes are situated in space in such a way that their respective measurement axes of the four gyroscopes are oriented according to the four trisectors of space.

9. The measurement method according to claim 4, in which N is equal to 4 and in which said four vibrating gyroscopes have three by three noncoplanar and two by two noncolinear measurement axes.

10. The measurement method according to claim 1, in which the vibration positions of the plurality of vibration positions are successively separated by an angle value corresponding to 360° divided by an integer.

11. The measurement method according to claim 1, in which the vibration positions of the plurality of vibration positions are determined to distribute the vibration positions used between 0 and $2\pi$ radians.

12. The measurement method according to claim 1, in which at least one of the corrected first and second angle values are obtained by furthermore taking a scaling factor into account.

13. A gyroscopic measurement system comprising at least:
    a vibrating gyroscope, as a first means of angle measurement, designed to change the vibration position of the vibrating gyroscope among a plurality of vibration positions and to provide a first measurement of angle values according to a measurement axis in one of the vibration positions of said plurality of vibration positions, said first means of angle measurement having a first zero reference and providing angle first values; and
    a second means of angle measurement, designed to provide a second measurement of angle values according to said measurement axis, said second means of angle measurement having a second zero reference as angle value and providing second angle values;
    said gyroscopic system furthermore comprising:
    a unit for correcting the second angle values, designed to provide corrected second angle values by adapting the second zero reference on the basis of a comparison of the first and second angle values obtained in a period of time;
    a unit for correcting the first angle values, designed to provide corrected first angle values by adapting the first zero reference on the basis of a comparison of the first and second angle values obtained in another period of time;

said units for correcting the first and second values being employed during a change in vibration position of at least the first means of angle measurement.

14. The gyroscopic measurement system according to claim 13, in which the first angle measurement means and the second angle measurement means alternately provide angle values during a change in vibration position of the first angle measurement means.

15. The gyroscopic measurement system according to claim 13, comprising a number N of vibrating gyroscopes, N being an integer greater than or equal to 3, the N gyroscopes being designed to change the vibration position of the N gyroscopes among a plurality of vibration positions and to provide respective measurements of angle values according to respective measurement axes in respective vibration positions of said plurality of vibration positions, the first measurement means corresponding to any one of N vibrating gyroscopes, the second measurement means corresponding to any set of gyroscopes among the N−1 other gyroscopes of the system and being designed to provide an angle measurement according to the measurement axis of the first measurement means and relative to the second zero reference.

16. The measurement system according to claim 15, in which N is equal to 3, said three vibrating gyroscopes having have two by two respectively coplanar and nonlinear measurement axes.

17. The measurement system according to claim 15, in which N is equal to 3 and in which the three gyroscopes are situated in the same plane such that the respective measurement axes form an angle approximately equal to 120°.

18. The measurement system according to claim 15, in which N is equal to 4 and in which the four gyroscopes are situated in space in such a way that the respective measurement axes of the four gyroscopes are oriented according to the four trisectors of space.

19. The measurement system according to claim 15, in which N is equal to 4, said four vibrating gyroscopes having three by three noncoplanar and two by two noncolinear measurement axes.

* * * * *